UNITED STATES PATENT OFFICE.

WILLIAM K. LEWIS, OF BOSTON, MASSACHUSETTS.

IMPROVEMENT IN CANNING BEANS AND PORK FOR FOOD.

Specification forming part of Letters Patent No. 193,880, dated August 7, 1877; application filed June 12, 1877.

*To all whom it may concern:*

Be it known that I, WILLIAM K. LEWIS, of Boston, in the county of Suffolk and State of Massachusetts, have invented certain new and useful Improvements in Putting up Beans for the Market, of which the following is a specification:

This invention relates to certain improvements in preparing and putting up beans for the market.

In order to prepare beans for the table it has heretofore been necessary to soak them in water until they are thoroughly softened, then to parboil them, and afterward bake them in an oven, with pork and other seasonings.

This is too tedious for general domestic purposes; and the object of my invention is to obviate this objection, and prepare and put up the beans with pork and other seasonings, and supply the same to the market, in condition for immediate use.

To this end my invention consists in soaking and parboiling them as heretofore, after which they are put up with pork and seasonings, if desired, and hermetically sealed in tin or other cans or vessels, and then baked, while thus hermetically sealed, by means of steam-heat.

In carrying out my invention, the beans are first well washed, and then soaked and parboiled in the usual manner. After being parboiled, they are packed in cans or other vessels of convenient size for use, with a suitable quantity of pork and seasoning material, and are then hermetically sealed. The cans are then subjected to a baking temperature, by placing them in a suitable chamber, and subjecting them to steam-heat for about six hours, or sufficient time to thoroughly bake the contents of the cans, after which they are allowed to cool, when the cans are ready to be labeled and packed for the market.

The advantages of having the beans properly prepared, seasoned, and cooked, and ready for immediate use, will be appreciated by housekeepers, and all persons who have found it necessary heretofore to prepare and cook the articles; and, furthermore, owing to the confinement during the baking process, the beans will be in a much more palatable condition, and will have a better flavor than when baked by the ordinary process.

In lieu of subjecting the cans containing the prepared beans to steam-heat in a chamber, as above described, they can be placed in a receptacle containing water, and the steam forced through the water by means of steam-pipes, or in any suitable manner, until the beans are properly baked; and, if desired, the water can, by the addition of salt or equivalent material, be made more dense, thereby aiding the baking process.

Having thus described my invention, what I claim is—

The process, substantially as described, of putting up baked beans for the market, the same consisting in first parboiling the beans, then placing them in a can with pork, and hermetically sealing the can, and afterward subjecting the can containing the parboiled beans and the pork to the action of heated water or steam, whereby the same are prepared for immediate use.

In testimony that I claim the foregoing I have hereunto set my hand in the presence of the subscribing witnesses.

WILLIAM K. LEWIS.

Witnesses:
EDWIN W. BROWN,
GEO. H. EARL.